USOO5895454A

United States Patent [19]
Harrington

[11] Patent Number: 5,895,454
[45] Date of Patent: Apr. 20, 1999

[54] INTEGRATED INTERFACE FOR VENDOR/PRODUCT ORIENTED INTERNET WEBSITES

[76] Inventor: Juliette Harrington, 86 Marine Drive, Diamond Harbour, RD 1, Lyttleton, New Zealand

[21] Appl. No.: 08/837,400

[22] Filed: Apr. 17, 1997

[51] Int. Cl.⁶ .................................................. G06F 153/00
[52] U.S. Cl. ........................... 705/26; 705/26; 705/27
[58] Field of Search .................. 705/26, 27; 380/24, 380/23; 435/5

[56] References Cited

U.S. PATENT DOCUMENTS

| | | | |
|---|---|---|---|
| 5,319,542 | 6/1994 | King, Jr. et al. | |
| 5,592,375 | 1/1997 | Salmon et al. | |
| 5,671,279 | 9/1997 | Elgamal | 380/23 |
| 5,710,887 | 1/1998 | Chelliah et al. | 705/26 |
| 5,715,314 | 2/1998 | Payne et al. | 380/24 |
| 5,727,048 | 3/1998 | Hiroshima et al. | 379/93.12 |
| 5,742,768 | 4/1998 | Gennaro et al. | 1/1 |
| 5,758,328 | 5/1998 | Giovannoli | 705/26 |
| 5,790,677 | 8/1998 | Fox et al. | 380/24 |
| 5,794,207 | 8/1998 | Walker et al. | 705/1 |

OTHER PUBLICATIONS

Paul; "Stores without door: Kiosks generate new profits", dialogue: File 275, acct# 01537785, Oct. 1992.

*Primary Examiner*—Allen R. MacDonald
*Assistant Examiner*—Romain Jeanty
*Attorney, Agent, or Firm*—Merchant, Gould, Smith, Edell, Welter & Schmidt, P.A.

[57] ABSTRACT

A method of effecting commerce in a networked computer environment in a computerized system is disclosed. A database of vendor product data and an associated database interface is established on a first computer. The interface allows remote access by one or more user(s). A local user interacts with the database by querying the database to specify a local users product/service specification. The database provides the local user with a selection of remote vendor network sites, where the selection is determined on the basis of the user querying the database. After the local user interactively connects with one or more of the remote vendor network sites, the user selects products/services from the information provided on the remote vendor network site. The selection of a particular product/service triggers a transaction notification which records the users selection and associated financial transaction data which is transmitted to the database and associated database interface. The local user may connect to subsequent remote vendor network sites, and each selection of a product/service also triggers a transaction notification which is transmitted to the database. The database and associated database interface provides information relating to the users realtime selection of products/services. During or at the conclusion of a local users shopping session, the user confirms the selection(s) whereby the database and associated database interface transmits purchase/ordering data to the remote vendor sites corresponding to the users selection.

8 Claims, 2 Drawing Sheets

INTEGRATED INTERFACE FOR VENDOR/PRODUCT ORIENTED INTERNET WEBSITES

FIELD OF TECHNOLOGY

The present invention relates to methods and apparatus for effecting electronic commerce by accessing and interacting with remote computer network vendor locations. More particularly, although not exclusively, the present invention relates to methods and apparatus for allowing a user to view, order and pay for products and/or services using the world wide web. Such products and/or services may be advertised via means of one or more remote vendor websites.

BACKGROUND TO THE INVENTION

The present invention is described in the context of the world wide web. However, the present invention may find application in any networked environment where one or more remote vendor product/service databases are accessible to a local user. In such environments, vendors can provide user accessible databases (for example commercial websites) which allow a local user to view information related to the products/services and purchase those products/services. In the following discussion the primary context will be the internet and the world wide web.

As the internet is becoming more commercially oriented, providers of products/services are exploring ways to promote and sell a wide range or products and services. Such efforts to date have generally taken the form of a vendor (or vendor company) establishing a website on a machine connected to the internet.

Such websites generally have a display and purchase functionality which is limited to a "filling in an order form" type of approach. A website is, in general terms, a server application which accepts connections from client programs. Client programs, such as browsers, allow a remote user to access the information stored on the website. Such information can include a broad range of multimedia data including textual, graphical, audio and animation information. A common client application is in the form of a web browser which, via mouse, keyboard or command line input, allows a user to 'navigate' his or her way around a website.

Commercial vendor websites are similar to other types of website except that they usually incorporate functionality to enable financial transactions between the remote user and the vendor. For example, a book publisher (vendor) might create a website devoted to a range of titles. This information can be made accessible to a remote user in the form of (for example) a text-searchable database which accepts standard query language (SQL), or similar, input and provides titles matching the search criteria which the remote user can then order. The user typically provides credit card details and the product is despatched by the vendor company.

This is an adequate way of effecting commerce on the internet in situations where a user knows precisely which website to connect to. However, although a number of vendors promote or advertise web capability, increases in the use of the internet has resulted in an unmanageable amount of information being accessible to a user. If a user merely wishes to browse for a particular product, or wishes to restrict the scope of potential remote vendors sites to visit, the only practical way is to carry out a search of the web using one of the available search engines. However, such search facilities are not effective in discriminating commercial from non-commercial sites and it may be very difficult to narrow a search sufficiently so that non-vendor sites are excluded and vendor sites satisfying desired criteria are identified. It would be an advantage if there existed an integrated interface and associated method which allowed a user to select a vendor site or range of vendor sites, where that selection can be made on the basis of a users particular requirements, and where a wide variety of consumer transactions can take place in an integrated environment while accessing a wide variety of vendor locations.

Accordingly, the present invention provides for a method and apparatus for organizing and integrating commercial interactions in a networked environment whereby a local user can locate and interact with a range of remote vendor locations and purchase goods/services where the local user has a high degree of control over the location of the remote vendor locations which are accessed. The present invention further provides for an integrated environment in which commercial transactions resulting from such interactions can be effected and further provides the public with a useful choice.

DISCLOSURE OF THE INVENTION

In one aspect the present invention provides, in a computerized system, a method of effecting commerce in a networked computer environment, the method comprising:

establishing a database of vendor product data and associated database interface on a first computer, where the interface allows remote access by one or more user(s);

a local user interacting with said database by means of the interface wherein the interaction comprises the user querying the database to specify a local users product/service specification;

the database providing the local user with a selection of remote vendor network sites, where the selection of remote vendor sites is determined on the basis of the users querying the database;

the local user interactively connecting with one or more of the remote vendor network sites whereby the local user is connected to the remote vendor network sites;

once connected to a remote vendor network site, the user selects products/ services from the information provided on the remote vendor network site wherein the selection of a particular product/service triggers a transaction notification which records the users selection and associated financial transaction data which is transmitted to the database and associated database interface, wherein the local user may connect to subsequent remote vendor network sites whereby each selection of a product/service triggers a transaction notification which is transmitted to the database;

the database and associated database interface providing information relating to the users realtime selection of products/services whereby during or at the conclusion of a local users shopping session, the user confirms the selection whereby the database and associated database interface transmits purchase/ordering data to the remote vendor sites corresponding to the users selection.

The database interface may provide a realtime representation of the users selection(s) including financial details, exchange rate information, total cost and delivery time.

Preferably the query step comprises the user specifying attributes or characteristics of the product/service such as geographical location of tie remote vendor, delivery time, nature of the good/service and the like.

Preferably the financial transaction step is effected using electronic point of sale transaction techniques.

Alternatively, the financial transaction step is effected by the user providing credit card details which are then validated and transmitted to the vendor and financial transaction service provider.

Alternatively, confirmation of the users selection is deferred until the user initiates confirmation wherein the database and associated interface provides a realtime total of a cash commitment for a particular series of remote vendor network site product/service selections.

Preferably the database contains information relating to the products/services provided by the remote vendor sites which are accessible or have, subscribed to the system, wherein the information corresponding to a particular vendor is sufficient to allow the database to effectively provide a selection of potential remote vendor network sites based on criteria or a query specified by the user.

Preferably, the transaction notification is effected by the user activating a selection button or similar interface element on the remote vendor interface.

BRIEF DESCRIPTION OF THE DRAWINGS

The present invention will now be described by way of example only and with reference to the drawings in which:

1. Illustrates a schematic of a network; and
2. Illustrates a schematic of a network showing the path of data transmission.

The following discussion will be primarily in the context of the internet and the world wide web. However, as will clear to one conversant in the technical field, the general technique described below is equally capable of application in a generalised network environment.

As noted in the background discussion, it is common for a vendor of products/services or a vendor company to establish a presence on the internet. For reasons of accessibility, a common technique is for a vendor to create a website. Such websites may contain simply 'pamphlet' style information designed to inform a casual browser of the vendors activities. However, with the improvements in modern communication speed, it has become possible to increase the information density to the extent that graphical, audio, animation as well as textual data may be readily 'displayed' on a vendors website. With increases in the download speed available to a user, it is possible to provide catalogues of vendor products and associated advertising material. It would be trite to attempt to describe the scope of future commercial websites as there will no doubt be continued development in his area.

With the rapid expansion of the internet, both geographically and in terms of actual machine numbers, the amount of information available has become cumbersome and a significant amount of time must be spent searching for specific information or websites of interest. To this end, there exist a number of freely accessible search engines which provide a search interface covering a large range of world wide web resources. However, while the existence of commerce on the net has increased, a major method by which users are informed of the existence of a vendor website is via direct print advertising or other means independent of the internet itself.

The present invention provides a means by which information relating to a large number of remote vendors can be accessed so that a user can be connected to a particular or selected vendor or alternatively be presented with a selection of suitable websites which meet the particular needs or requirements of the user.

Figure 1:
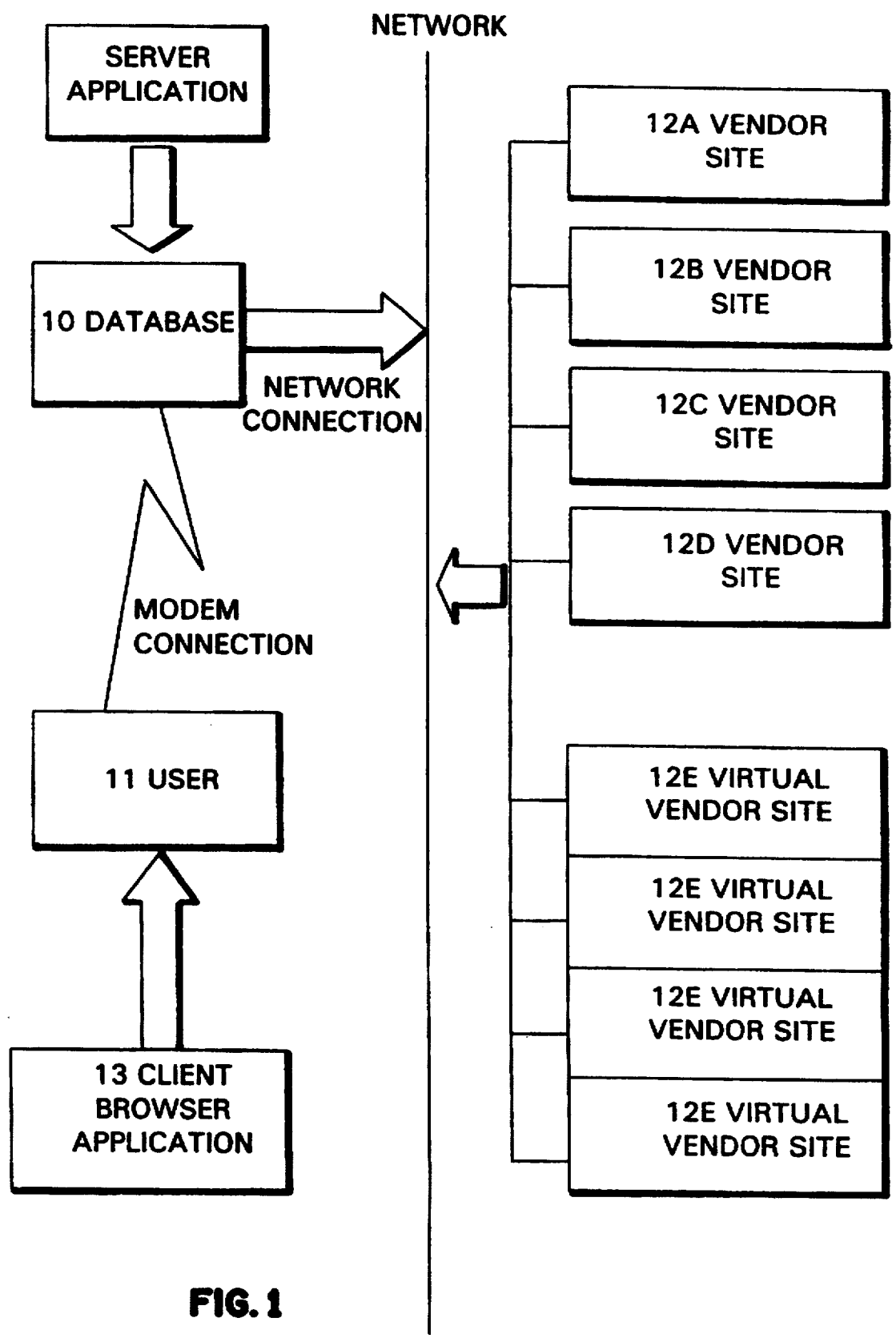

Referring to FIG. 1, a highly schematic diagram of a network layout is shown. A database 10 and associated database interface (20 in FIG. 2) are provided on an internet accessible machine. The database and associated software may be administered by (for example) a local party. The interactive electronic commerce system is envisaged to be run as a database front-end with multiuser capability in a similar way as a large number or server applications on the internet.

Figure 2:
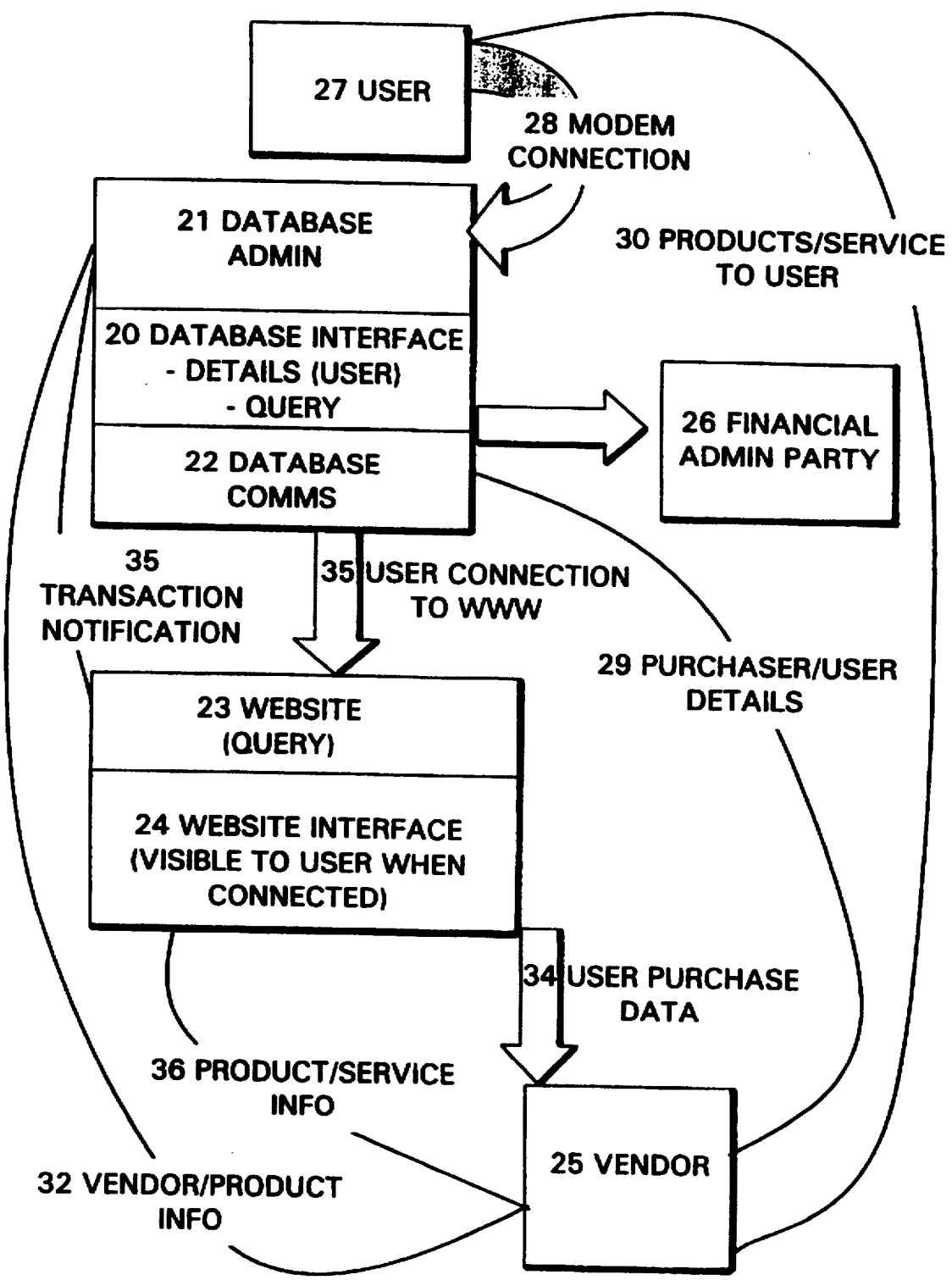

FIG. 2 illustrates a schematic of a network showing the flow of information/data as well as physical goods. The database 10 would contain information (represented as information originating from vendor 32) relating to vendor products, locations, website addresses, price, maps etc. A user 11 would (after connecting to the database machine) specify particular criteria which would be used by the database search engine 21 to provide a list of suitable websites which match the users product/service criteria. The database front-end 20 would then provide connectivity functionality 22 to enable the user to connect 35 to any of the websites 12a–g (in FIG. 1) whereupon the user 11 would interact with the remote vendor website 23 using the commands and structured data Hierarchy (24) as originally established by the vendor 25 (or the vendors website designer as the case may be).

As the user 11 or 27 navigates through the remote vendors website (eg 12a) the user may return to the database interface 20 to launch into a different remote vendor website (eg 12b). However, if, while the user 11 is reviewing the products/services provided by the vendor 25, the user wishes to order or otherwise purchase a product/service he or she (generally) clicks on a 'purchase' icon or button. The particular purchase notification means may vary from website to website, however the actual functionality and effect of the purchase/order interface according to the present invention is critically different from a standalone website according to the following functionality.

If a user activates the 'purchase' button (as an example of a purchase/selection notification means), the vendors modified website software 24 transmits a transaction notification (33 in FIG. 2) back to the database administration software 21. This indication may be in the form of a data packet 33 including information relating to the product/service ordered, the price, availability and other identifying data relevant to the user. As the user navigates his or her way through a particular vendor website (e, 12a) or number of vendor websites (eg 12a–f), multiple transaction notifications 33 can be sent back to the database administration software 21. The administration software 21 monitors the user's purchases and provides a realtime total or cost, goods ordered etc. to the user. Currency conversion is handled transparently and supplementary information (such as delivery times etc) may is provided to the user.

Financial transactions could be handled in a variety of ways. The simplest would be for the user to provide credit card details 29 of which would be provided to the vendor 25 as part of the transaction notification. Alternatively other financial transaction methods could be implemented according to a number of techniques being developed in the field of secure electronic commerce. For example direct billing to a Financial Administration Party 26.

The administration software 10 handles all cost allocations appropriate within a particular transaction, whether in the form of revenue to be diverted to the physical database administrator, a telecommunications carrier or other third party. Such a transaction dependence would be specified by the type of transaction or purchase and perhaps the particular vendor.

In terms of the establishment of this system, the administration party would operate the database 10, in one embodiment, as a subscription service to the vendors. The vendors would provide information about their products/services 32 which are to be made accessible to searchers (users) of the database. It is envisaged that vendors would supply product/service information to the database administrator in a standard (preferably electronic) format 32 whereby it may be easily imported into the large relational database which is accessible through the associated interlace. It is envisaged that revenue would be generated via advertising as well as the provision of services. As is well known on the internet advertising space on web pages an be sold with an exceptionally large potential target audience. Vendors would be charged an initial 'connection' fee with a monthly fee to be accessible on the database. A further service which could be provided is that a vendor may choose to have their website 24 created by the database administrator (ie: a virtual website). This latter option would aid in creating websites with uniform data interchange standards which would enhance the amount and type of data (36 or 32) which could be exchanged between the vendors website 23 and the database administration software 21.

In terms of the user perceived functionality of the system, the following description provides details of a number or features and the general operation of the system.

If a user wishes to obtain specific products/services from the Australian Geographical region only with a delivery time of 3 days or less, these criteria would be input into the database interface 20 using, iconic, text or similar input means. For example, a world map may be shown and the user may select an area of interest by clicking on a point on the map, whereupon the area may be progressively narrowed by further clicking in subregions on the map. A hierarchical scheme could allow the selection of country, city or region based criteria depending on the users specific requirements. The nature of the goods could be input using a predefined set of selectable categories. For example products might be divided into classifications such as electronic goods, toys etc. The user may select these groups and be guided through the available products by a further hierarchical or nested menu system. Alternatively the user would provide keyword strings to allow the database to identify appropriate websites. The user may be guided through the steps of inputting data in the form of a structured query interface such as those found on common search engines. However, the input would be processed by a specifically tailored search engine to identify the most appropriate websites which meet the users criteria.

The type of information supplied by the user may be extended to include a desired price range, delivery time and other relevant data. Further, once information relevant to the user 29 is made accessible to the database administration software (by means of the user 'filling in' a registration page), the database can locate the user geographically in order to provide maps and other information which the user might need to locate the service or find the vendor physically. Such functionality would be useful in the context of local service such as take away food etc. In terms of local sites/locations, a user might also specify that he or she only wants to shop a ralls whereupon the database would provide the nearest suitable rall (if any) which meets the users requirements.

It is envisaged that the information provided by the database should 'direct' the user to either real, real internet or virtual internet vendor sites. A real vendor site is a site which may have no connection to the internet, but have details and information accessible on the database. Whereas real internet and virtual internet vendor sites are those which are directly accessible from the database in the form of a vendor website or similar interactive ordering interface. Both types of vendor may coexist on the database.

Other search criteria might include search criteria which addresses a particular target or target group, such as a recipient of a gift. Factors such as preference, age, demographics etc could be included in the database and used in determining the appropriate products or vendor sites for connection.

There are many further features which would be implemented in the database administration software. For example, internet radio could be used to provide music for a user while 'shopping', information as to various specials of short database duration could also be accessible in a particular area on the database.

It is envisaged that a feature which provides significant utility is the 'shopping trolley' functionality. This would show the user the current realtime cost of their purchases to date. A user can review the contents of the shopping trolley and see where the purchases have been made. The user can further allocate different methods of payment (ie; different credit cards) to each product or group of products. The user may also remove or add additional items. Confirmation functionality would confirm the purchases with the administration software thus completing the procedure.

There are a number of variations and modifications contemplated within the scope of the present invention. However it is believed that the provision of an integrated system such as that described above would be of great utility in a network environment where increasing information overload tends to obscure what useful information is available. It is envisaged that the adaptation of a vendors preexisting website to provide the transaction notification functionality would not be particularly difficult and would be made available to the user (or incoming connection) depending on whether the Connection originated from the database administrator or a 'standard' connection from the world wide web. It is further envisaged that while the description above has been given in the context of shopping, the present method could be adapted for searching for other "focussed" subject matter on the internet. Examples of such subject matter include entertainment or games.

Where in the foregoing description reference has been made to elements or integers having know equivalents, then such equivalents are included as if they were individually set forth.

Although the invention has been described by way of example and with reference to particular embodiments, it is to be understood that modifications and/or improvements may be made without departing from the scope of the appended claims.

I claim:

1. In a computerized system, a method of effecting commerce in a networked computer environment, the method comprising:

establishing a database of vendor product data and associated database interface on a first computer, where the interface allows remote access by one or more user(s);

a local user interacting with said database by means of the interface wherein the interaction comprises the user querying the database to specify a local users product/service specification;

the database providing the local user with a selection of remote vendor network sites, where the selection of remote vendor sites is determined on that basis of the users querying the database;

the local user interactively connecting with one or more of the remote vendor network sites whereby the local user is connected to the remote vendor network sites;

once connected to a remote vendor network site, the user selects products/services from the information provided on the remote vendor network site wherein the selection of a particular product/service triggers a transaction notification which records the users selection and associated financial transaction data which is transmitted to the database and associated database interface, wherein the local user may connect to subsequent remote vendor network sites whereby each selection of a product/service triggers a transaction notification which is transmitted to the database;

the database and associated database interface providing information relating to the users realtime selection of products/services whereby during or at the conclusion of a local users shopping session, the user confirms the selection whereby the database and associated database interface transmits purchase/ordering data to the remote vendor sites corresponding to the users selection.

2. A method as claimed in claim 1 wherein the database interface provides a realtime representation of the users selection(s) including financial details, exchange rate information, total cost and delivery time.

3. A method as claimed in claim 1 wherein the query step comprises the user specifying characteristics of the product/service including geographical location of the remote vendor, delivery time, nature of the good/service.

4. A method as claimed in claim 1 wherein the financial transaction step is effected using electronic point of sale transaction techniques.

5. A method as claimed in claim 1 wherein the financial transaction step is effected by the user providing credit card details which are then validated and transmitted to the vendor and financial transaction service provider.

6. A method as claim in claim 1 wherein confirmation of the users selection is deferred until the user initiates confirmation wherein the database and associated interface provides a realtime total of a cash containment for a particular series of remote vendor network site product/service selections.

7. A method as claimed in claim 1 wherein the database contains information relating to the products/services provided by the remote vendor sites which are accessible, wherein the information corresponding to a particular vendor is sufficient to allow the database to effectively provide a selection of potential remote vendor network sites based on criteria specified by the user.

8. A method as claimed in claim 1 wherein the transaction notification is effected by the user activating a selection button on the remote vendor interface.

* * * * *